United States Patent
Jung

(10) Patent No.: US 7,989,717 B2
(45) Date of Patent: Aug. 2, 2011

(54) CONNECTION SWITCHPANEL FOR MEDIUM-VOLTAGE SWITCHGEAR

(75) Inventor: Wolfgang Jung, Frankfurt (DE)

(73) Assignee: Siemens Aktiengesellschaft, Munich (DE)

( * ) Notice: Subject to any disclaimer, the term of this patent is extended or adjusted under 35 U.S.C. 154(b) by 296 days.

(21) Appl. No.: 12/302,908

(22) PCT Filed: May 23, 2007

(86) PCT No.: PCT/EP2007/055002
§ 371 (c)(1),
(2), (4) Date: Dec. 1, 2008

(87) PCT Pub. No.: WO2007/137976
PCT Pub. Date: Dec. 6, 2007

(65) Prior Publication Data
US 2009/0316339 A1    Dec. 24, 2009

(30) Foreign Application Priority Data
May 29, 2006    (DE) .................... 20 2006 008 709 U

(51) Int. Cl.
*H01H 31/00*    (2006.01)
(52) U.S. Cl. ........................ 200/48 R; 361/612; 218/2
(58) Field of Classification Search .......... 361/600–634, 361/641–647; 218/2–14, 44, 45, 55, 79, 218/80, 100; 200/48 R–48 CB, 50.32–50.39
See application file for complete search history.

(56) References Cited

U.S. PATENT DOCUMENTS

| 4,996,485 A | | 2/1991 | Itai | |
|---|---|---|---|---|
| 5,521,567 A | * | 5/1996 | Devonald et al. | 335/132 |
| 5,715,134 A | * | 2/1998 | Maineult et al. | 361/604 |
| 6,510,046 B2 | * | 1/2003 | Arioka et al. | 361/612 |
| 6,759,616 B2 | * | 7/2004 | Rokunohe et al. | 218/2 |
| 7,391,605 B2 | * | 6/2008 | Sologuren-Sanchez et al. | 361/612 |
| 7,813,109 B2 | * | 10/2010 | Kikukawa et al. | 361/612 |
| 2002/0012226 A1 | * | 1/2002 | Arioka et al. | 361/618 |
| 2005/0201028 A1 | * | 9/2005 | Inami et al. | 361/62 |
| 2008/0067152 A1 | * | 3/2008 | Kikukawa et al. | 218/139 |
| 2009/0237869 A1 | * | 9/2009 | Kikukawa et al. | 361/612 |

FOREIGN PATENT DOCUMENTS

| EP | 0199044 A2 | | 10/1986 |
|---|---|---|---|
| EP | 199044 A2 | * | 10/1986 |
| JP | 2007014086 A | * | 1/2007 |

* cited by examiner

*Primary Examiner* — Michael A Friedhofer
(74) *Attorney, Agent, or Firm* — Laurence A. Greenberg; Werner H. Stemer; Ralph E. Locher

(57) ABSTRACT

A connector switchpanel for medium voltage switchgear assemblies includes first and second feed devices connected together by conductors with a busbar branch on a connector. Disconnectors disconnecting the conducting connection and disconnecting the busbar branch and grounding contacts are provided. An improved compact construction and simplified operation are provided due to the connector switchpanel being a gas-insulated switchpanel and each of the first and second feed devices being connected by a three-position switch to the busbar branch with contact, disconnecting and grounding positions.

3 Claims, 2 Drawing Sheets

CONNECTION SWITCHPANEL FOR MEDIUM-VOLTAGE SWITCHGEAR

BACKGROUND OF THE INVENTION

Field of the Invention

The invention relates to a connection switchpanel for medium-voltage switchgear assemblies with a first and a second feed device, which are conductively connected to one another via connecting means, and with a busbar branch on the connecting means, disconnecting means for disconnecting the conductive connection and for isolating the busbar branch and grounding means being provided.

Such a connection switchpanel is known. The known connection switchpanel has a first and a second feed device, which are conductively connected to one another via connecting means in the form of copper rails which can be attached by screws. A busbar branch is conductively connected to one of the copper rails, which busbar branch is used for connecting further switchpanels, such as circuit-breaker panels or contactor switchpanels, for example, of the medium-voltage switchgear assembly. Disconnecting means for disconnecting the conductive connection and for isolating the busbar branch are formed in this previously known connection switchpanel by virtue of the fact that individual parts of the copper rails of the respective feed devices are dismantled such that the conductive connection is disconnected. Grounding means are formed by virtue of the fact that the individual feed devices are connected to a grounding contact by means of additional copper rails which can be fitted. The previously known connection switchpanel is in this case in the form of an air-insulated connection switchpanel.

Disadvantages of this previously known connection panel are a high space requirement as a result of the air-insulated construction and, owing to the formation of the disconnecting means and grounding means as copper rails which can be dismantled or fitted, an increased risk of the switchpanel being impaired in terms of its function as a result of the fitting or dismantling being carried out improperly.

BRIEF SUMMARY OF THE INVENTION

The object of the present invention is to develop a connection switchpanel of the type mentioned at the outset which has a compact construction and simplified operation.

In accordance with the invention, this object is achieved in the case of a connection switchpanel of the type mentioned at the outset by virtue of the fact that the connection switchpanel is in the form of a gas-insulated switchpanel, and each of the first and second feed devices is connected to the busbar branch and to one another in each case via a three-position switch disconnector with a contact, disconnecting and grounding position.

As a result of the embodiment using gas-insulated technology, a compact construction in comparison with air-insulated technology is advantageously achieved. Owing to in each case one three-position switch disconnector for each of the feed devices it is easily possible to disconnect each of the first and second feed devices from the other and from the busbar branch or to ground the respective feed devices via the grounding position of the three-position switch disconnector.

In an advantageous configuration of the invention, respective phases of the first and the second feed devices are each arranged next to one another, the first and the second feed devices being spaced apart from one another in the horizontal and in the vertical direction.

In the case of a gas-insulated connection switchpanel, a compact construction is advantageously formed with such a horizontally and vertically spaced-apart arrangement since gaps between individual phases can be selected to be small in the case of gas-insulated switchpanels and a horizontally and vertically spaced-apart arrangement has a low space requirement.

In an expedient development of the invention, connections for the individual phases of each feed device have at least three cable connections. With such a configuration of the connections, it is easily possible for a plurality of cables to be connected to in each case one phase of each feed device.

BRIEF DESCRIPTION OF THE SEVERAL VIEWS OF THE DRAWING

The invention will be explained in more detail below using the drawing and an exemplary embodiment with reference to the attached figures, in which.

DESCRIPTION OF THE INVENTION

Figure 1:
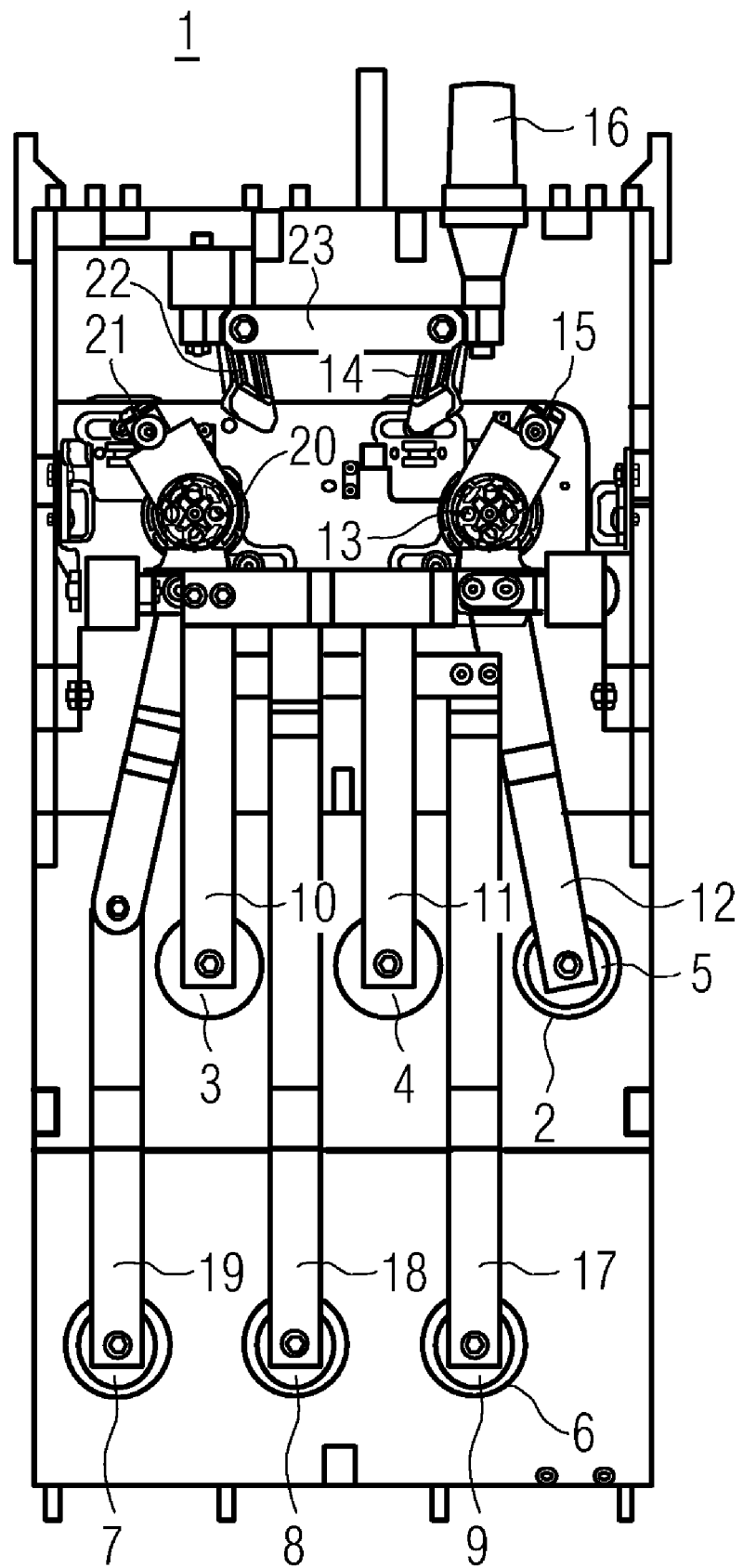
FIG. 1 shows a rear view of a connection switchpanel according to the invention.

FIG. 1 shows a rear view of a connection switchpanel 1 with a first feed device 2 with phase connections 3, 4 and 5 and a second feed device 6 with further phase connections 7, 8 and 9, in each case for connection to a three-phase supply system. The phase connections 3, 4 and 5 of the first feed device 2 are conductively connected to a first three-position disconnector 13 via conductor bars 10, 11 and 12. The three-position disconnector 13 in this case has in each case one connection means and a movable switch blade for each of the conductor bars 10, 11 and 12 and will be explained in more detail further below with reference to FIG. 2. The three switch blades of the first three-position disconnector 13 are capable of moving between a first connecting contact 14, a breaking position and a first grounding contact 15 by means of a drive (not illustrated in the figures). The first connecting contacts 14 are conductively connected to a busbar branch 16. The second feed device 6 with the further phase connections 7, 8 and 9 is conductively connected, via further conductor bars 17, 18 and 19, to a second three-position disconnector 20, which, just as the first three-position disconnector 13, has connection means for the further conductor bars 17, 18 and 19 and three switch blades for the three phases. The three switch blades of the second three-position disconnector 20 are likewise capable of being moved between second grounding contacts 21, an off position and second connecting contacts 22 via a drive (not illustrated in the figures). Connecting rails 23 are provided for connecting the first connecting contacts 14 to the second connecting contacts 22 and to the busbar branch 16. The phase connections 3, 4 and 5 of the first feed device 2 are each arranged next to one another, as are the further phase connections 7, 8 and 9 of the second feed device 6, the phase connections of the first feed device 2 being arranged in such a way that they are spaced apart vertically with respect to the further phase connections of the second feed device 6, and a offset through in each case one phase between the further phase connections 7, 8 and 9 and the phase connections 3, 4 and 5 being provided in the horizontal alignment.

Figure 2:
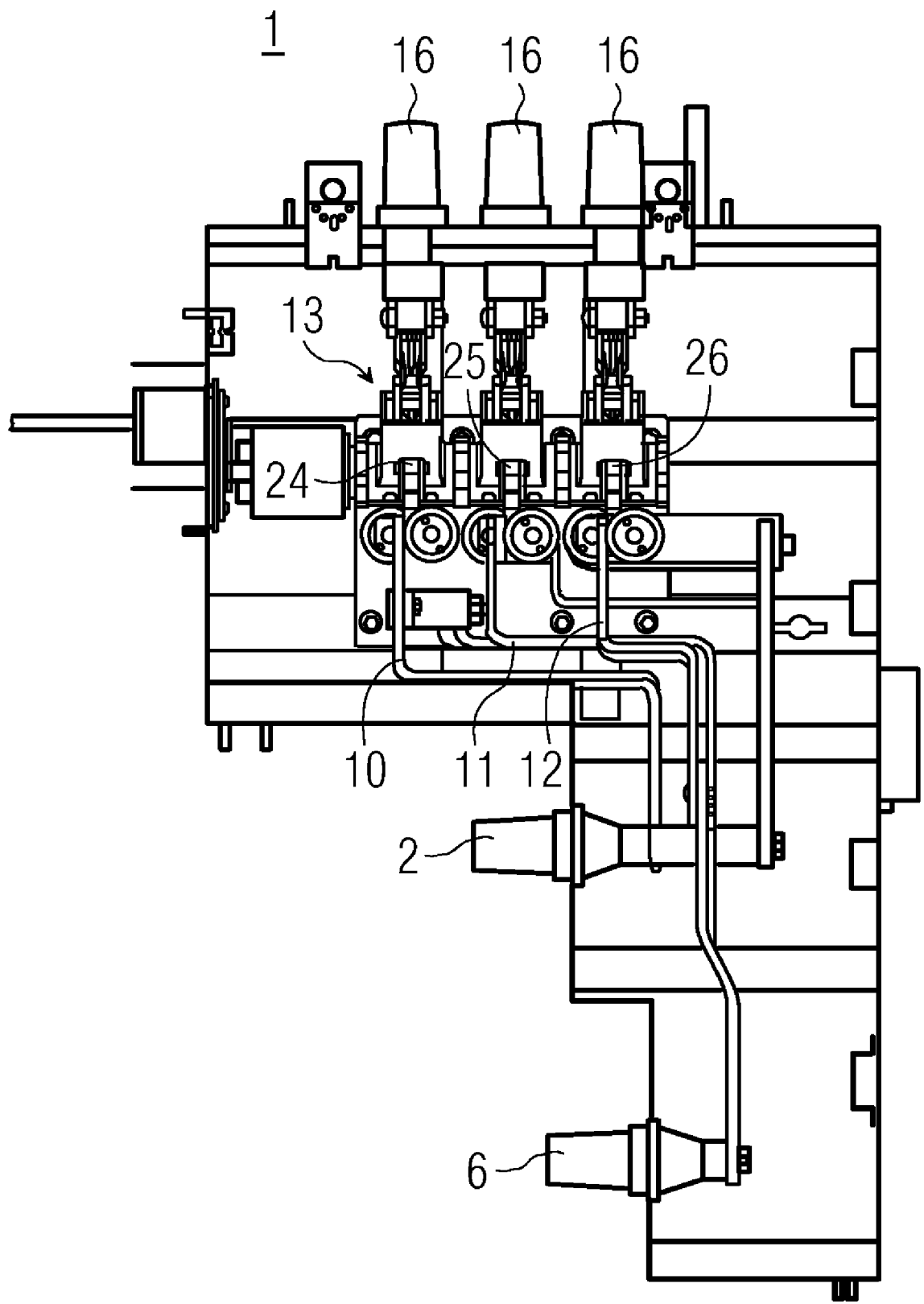
FIG. 2 shows a side view of the connection switchpanel according to the invention in FIG. 1.

FIG. 2 shows a side view of the connection panel 1 with the first feed device 2, which is arranged such that it is spaced apart vertically with respect to the second feed device 6. As a result of the vertically spaced-apart arrangement and the lateral offset of the respective phase connections, the connection panel 1 is stepped in the region of the first and second feed devices 2 and 6. FIG. 2 shows the connection between the phase connections 3, 4 and 5 of the first feed device 2 via the conductor bars 10, 11 and 12 and the three switch blades 24, 25 and 26 of the first three-position disconnector 13. Likewise shown is the conductive connection between the first connecting contacts 14 of the first three-position disconnector 13 and the three-phase busbar branch 16.

During operation, the connection panel is connected to a feeding cable section of a magnetic-levitation transport system, for example, via the first and the second feed devices 2 and 6 and acts as a branch by means of the busbar branch 16 to further switchpanels of the medium-voltage switchgear assembly in the same way as a circuit-breaker panel or contactor switchpanel, for example. The respective switch blades of the first three-position disconnector 13 and the second three-position disconnector 20 are each conductively connected to the first connecting contacts 14 and the second connecting contacts 22, respectively, with the result that a conductive connection with the further phase connections 7, 8 and 9 of the second feed device 6 is formed by the phase connections 3, 4 and 5 of the first feed device 2 via the switch blades of the first three-position disconnector 13, the connecting rails 23, the second three-position disconnector 20 with its switch blades. The contactor switchpanel (not illustrated in the figures) is connected to the cable connection panel via the busbar branch 16, which is connected to the connecting rails 23. In the event of a fault, it is easily possible via the first three-position disconnector 13 and the second three-position disconnector 20 to disconnect the first feed device 2 or the second feed device 6 from the contactor switchpanel, which is connected to the connection switchpanel 1 via the busbar branch 16, or to ground the respective feed device, by means of the respective switch blades of the first three-position disconnector 13 or of the second three-position disconnector 20 being brought into their disconnecting position or their grounding position. This is particularly possible as a result of simple manipulation by means of a drive which can be actuated manually and does not require connecting means to be fitted or dismantled in the region of the conductor bars of the connection switchpanel 1. As a result, in particular the operational reliability of the connection panel 1 is markedly improved.

LIST OF REFERENCE SYMBOLS

1 Connection switchpanel
2 First feed device
3, 4, 5 Phase connections
6 Second feed device
7, 8, 9 Further phase connections
10, 11, 12 Conductor bars
13 First three-position disconnector
14 First connecting contacts
15 First grounding contacts
16 Busbar branch
17, 18, 19 Further conductor bars
20 Second three-position disconnector
21 Second grounding contacts
22 Second connecting contacts
23 Connecting rails
24, 25, 26 Switch blades

The invention claimed is:

1. A gas-insulated connection switchpanel for medium-voltage switchgear assemblies, the connection switchpanel comprising:
   first and second feed devices;
   connectors conductively connecting said first and second feed devices to one another;
   a busbar branch on said connectors;
   disconnectors for disconnecting said conductive connection and for isolating said busbar branch;
   a grounding device,
   three-position switches with contact, disconnecting and grounding positions, said three-position switches each connecting a respective one of said first and second feed devices to said busbar branch and to one another; and
   said first and second feed devices having respective phase connections disposed next to one another, and said first and second feed devices being spaced apart from one another in horizontal and vertical directions.

2. The connection switchpanel according to claim 1, wherein said first and second feed devices each have individual phases with phase connections having at least three cable connections.

3. The connection switchpanel according to claim 1, wherein said phase connections of individual phases of each of said feed devices have at least three cable connections.

* * * * *